United States Patent
Saito et al.

(10) Patent No.: US 8,369,201 B2
(45) Date of Patent: Feb. 5, 2013

(54) OPTICAL PICKUP, OPTICAL DRIVE APPARATUS, AND LIGHT ILLUMINATION METHOD

(75) Inventors: Kimihiro Saito, Kanagawa (JP); Norihiro Tanabe, Kanagawa (JP); Hirotaka Miyamoto, Kanagawa (JP); Takahiro Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 13/053,566

(22) Filed: Mar. 22, 2011

(65) Prior Publication Data

US 2011/0242951 A1 Oct. 6, 2011

(30) Foreign Application Priority Data

Apr. 2, 2010 (JP) ................................. 2010-086176

(51) Int. Cl.
*G11B 7/00* (2006.01)
(52) U.S. Cl. ................. 369/103; 369/53.28; 369/112.23
(58) Field of Classification Search ............... 369/44.14, 369/53.23, 53.28, 94, 103, 112.23
See application file for complete search history.

(56) References Cited

U.S. PATENT DOCUMENTS

| | | | | |
|---|---|---|---|---|
| 5,883,747 A * | 3/1999 | Yamazaki et al. | ............ | 359/719 |
| 7,170,661 B2 * | 1/2007 | Ogasawara et al. | ............ | 359/22 |
| 7,248,389 B2 * | 7/2007 | Toishi | ............ | 359/22 |
| 2002/0009045 A1 * | 1/2002 | Tsukagoshi et al. | ........ | 369/275.3 |
| 2003/0103437 A1 * | 6/2003 | Kimura | .................... | 369/112.02 |
| 2006/0098213 A1 * | 5/2006 | Itoh et al. | ........................ | 356/632 |
| 2008/0205257 A1 | 8/2008 | Yamatsu et al. | | |
| 2009/0080321 A1 * | 3/2009 | Kimura et al. | ............ | 369/112.23 |
| 2009/0290478 A1 * | 11/2009 | Shiono | ..................... | 369/112.23 |
| 2010/0172228 A1 * | 7/2010 | Saito et al. | ............... | 369/112.03 |

FOREIGN PATENT DOCUMENTS

| | | |
|---|---|---|
| JP | 2008-135144 | 6/2008 |
| JP | 2008-176902 | 7/2008 |

\* cited by examiner

*Primary Examiner* — Thomas Alunkal
(74) *Attorney, Agent, or Firm* — Wolf, Greenfield & Sacks, P.C.

(57) ABSTRACT

There is provided an optical pickup including: an optical-system having an object-lens illuminating a first light for information recording or reproducing on a recording layer as a target and a second light on an optical-recording medium including a reference plane having a reflection-layer and the recording-layer at a layer position different from that of the reference-plane and on which information recording is performed through mark formation, and a focus-aligned-position-adjusting unit adjusting a focus-aligned position of the first light through the object-lens by changing collimation thereof incident to the object-lens; and a focusing-mechanism driving the object-lens in a focusing direction, wherein, when a depth of focus $\lambda/NA^2$ defined by a wavelength $\lambda$ of the first light and a numerical aperture NA of the object lens is set to $\alpha$ and the maximum-surface-blur range is denoted by D, the optical-system is designed so that a use magnification ratio $\beta$ satisfies $|\beta| \geq \sqrt{(D/\alpha)}$.

5 Claims, 12 Drawing Sheets

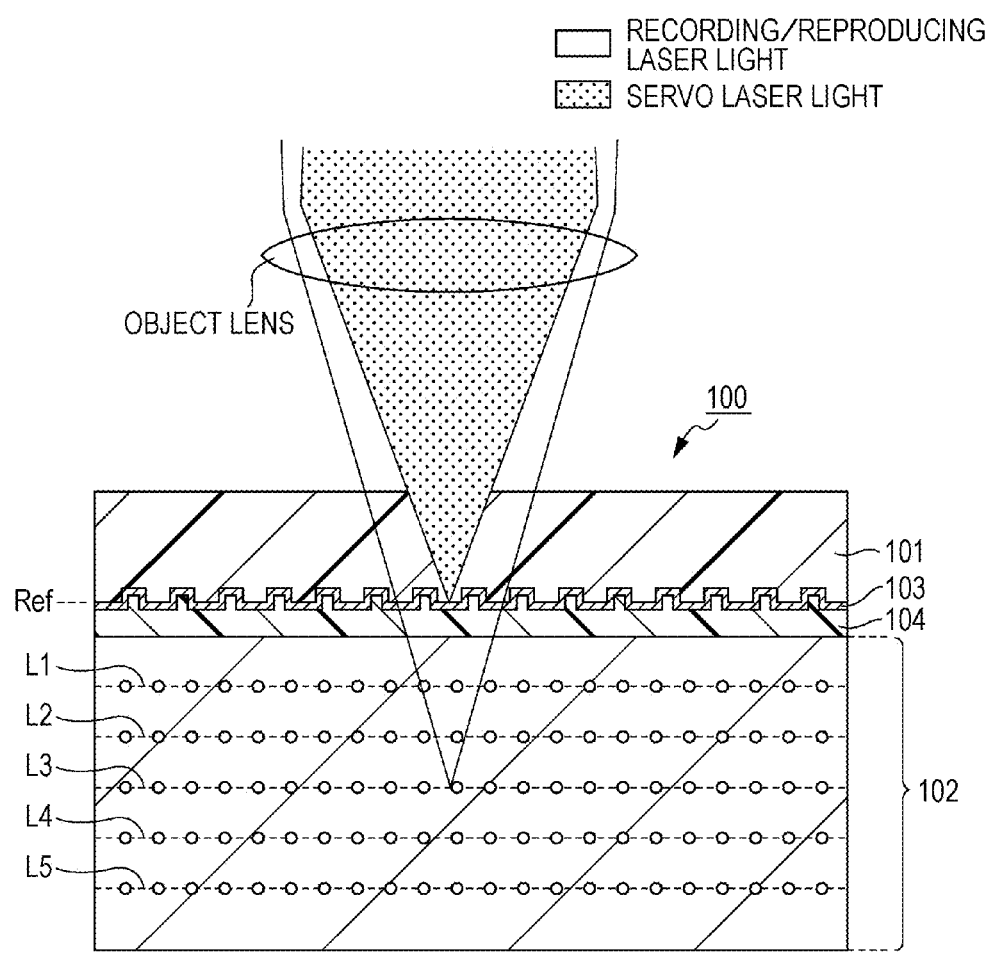

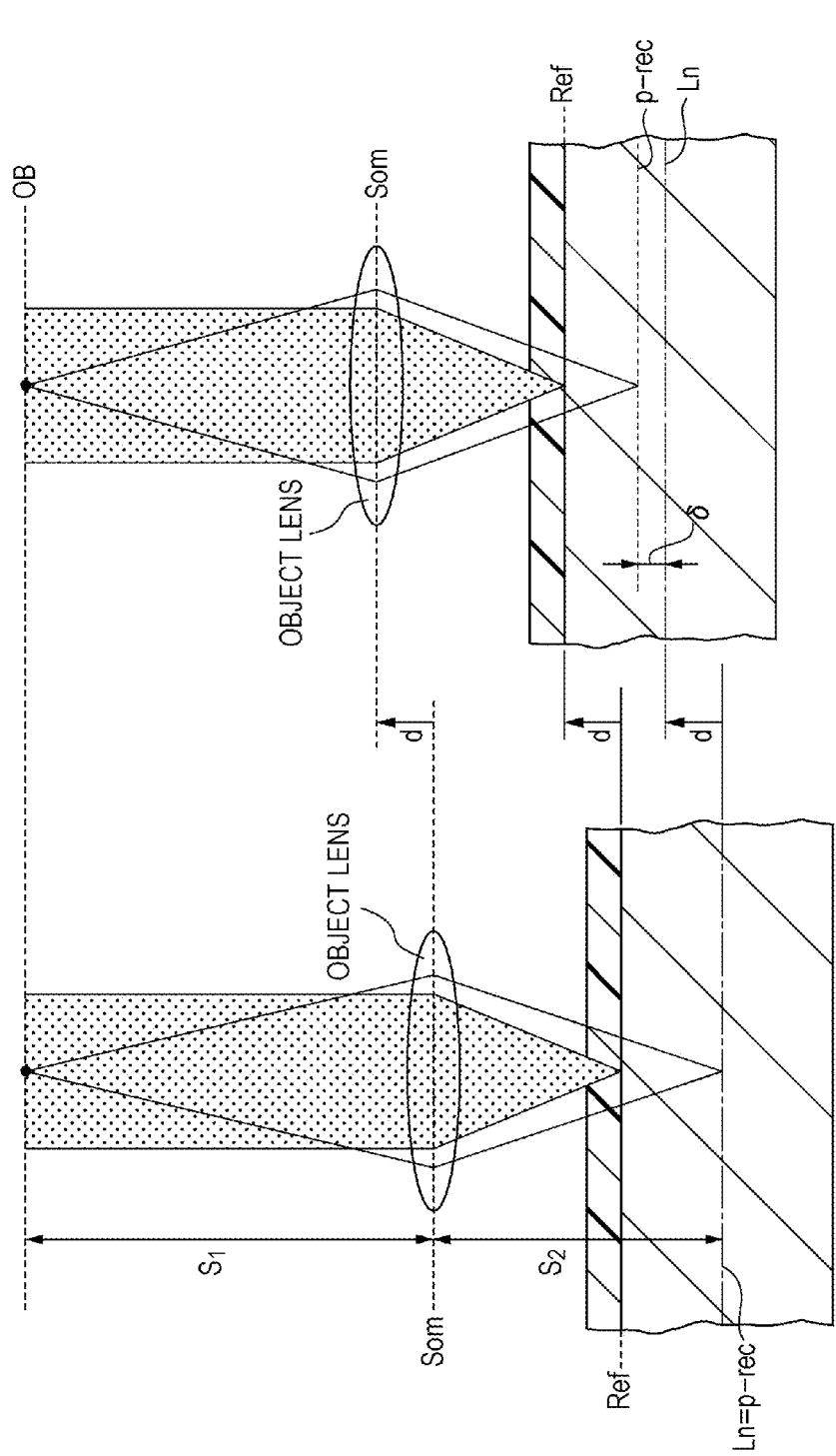

OPTICAL PICKUP, OPTICAL DRIVE APPARATUS, AND LIGHT ILLUMINATION METHOD

BACKGROUND OF THE INVENTION

1. Field of the Invention

The present invention relates to an optical pickup which is configured to allow a common object lens to illuminate a first light for performing information recording or information reproducing on a recording layer as a target and a second light different from the first light with respect to an optical recording medium, which includes a reference plane having a reflection film and the recording layer which is disposed at a layer position different from that of the reference plane and on which information recording is performed through mark formation according to light illumination, and to adjust a focus-aligned position of the first light passing through the object lens by changing collimation of the first light incident to the object lens. In addition, the invention relates to an optical drive apparatus having the optical pickup and a light illumination method.

2. Description of the Related Art

As an optical recording medium for recording/reproducing signals through light illumination, there have been widely provided the so-called optical discs such as a CD (Compact Disc), a DVD (Digital Versatile Disc), and a BD (Blu-ray Disc: registered trade mark).

As a next-generation optical recording medium with respect to the currently provided optical recording medium such as a CD, a DVD, and a BD, the inventor has already proposed the so-called bulk recording type optical recording medium disclosed in Japanese Unexamined Patent Application Publication No. 2008-135144 or 2008-176902.

Herein, the bulk recording is a technology for implementing a large recording capacity by performing multi-layer recording in a bulk layer (recording layer) 102 by performing laser light illumination with respect to an optical recording medium (bulk type recording medium 100) including, for example, at least a cover layer 101 and the bulk layer (recording layer) 102 as illustrated in FIG. 5 while sequentially changing a focus position.

With respect to the bulk recording, Japanese Unexamined Patent Application Publication No. 2008-135144 discloses a recording technology referred to as a micro-hologram method.

As illustrated later in FIG. 6, the micro-hologram method is mainly classified into a positive type micro-hologram method and a negative type micro-hologram method.

In the micro-hologram method, a so-called hologram recording material is used as a recording material for the bulk layer 102. As the hologram recording material, for example, a light-polymerized material such as a photopolymer or the like is widely known.

The positive type micro-hologram method is a method where two facing light flux (light flux A and light flux B) are focused at the same position to form a fine interference fringe (hologram) and the interference fringe is used as a recording mark as illustrated in FIG. 6A.

In addition, the negative type micro-hologram method illustrated in FIG. 6B is a method where, as the opposite concept of the positive type micro-hologram method, a preformed interference fringe is erased through laser light illumination and the erased portion is used as a recording mark.

FIGS. 7A and 7B are diagrams illustrating the negative type micro-hologram method.

In the negative type micro-hologram method, before a recording operation is performed, an initialization process for forming the interference fringe is performed on the bulk layer 102 in advance as illustrated in FIG. 7A. More specifically, as illustrated in the figure, the facing light flux C and D as parallel light are illuminated, so that the interference fringe are formed over the entire bulk layer 102.

In this manner, after the interference fringe is formed in advance by the initialization process, information recording is performed by forming the erase mark as illustrated in FIG. 7B. More specifically, in the state where the focus is aligned at an arbitrary layer position, the laser light illumination is performed according to the recording information, so that the information recording through the erase mark is performed.

In addition, as a bulk recording method different from the micro-hologram method, the inventor proposed a recording method of forming voids as the recording marks disclosed in, for example, Japanese Unexamined Patent Application Publication No. 2008-176902.

The void recording method is a method of recording the voids in the bulk layer 102 by performing the laser light illumination with a relatively high power with respect to the bulk layer 102 which is configured with a recording material, for example, a light-polymerized material such as a photopolymer or the like. As disclosed in Japanese Unexamined Patent Application Publication No. 2008-176902, the reflective index of the void portions formed in this manner is different from those of other portions in the bulk layer 102, so that it is possible to increase light reflectance in the boundaries. Therefore, the void portions may function as the recording marks, so that the information recording through the formation of the void marks may be implemented.

Since the void recording method is the method of forming no hologram, when light illumination from one side is performed, the recording is completed. In other words, unlike the case of the positive type micro-hologram method, it is not necessary to focus two light flux at the same position so as to form the recording mark.

In addition, in comparison with the negative type micro-hologram method, there is an advantage in that the initialization process is unnecessary.

In addition, Japanese Unexamined Patent Application Publication No. 2008-176902 discloses an example where, at the time of performing the void recording, illumination of precure light before the recording is performed. However, although the illumination of precure light is omitted, the void recording is possible.

Although various recording methods described above are proposed for the bulk recording type (simply, referred to as a bulk type) optical disc recording medium, the recording layer (bulk layer) of the bulk type optical disc recording medium do not explicitly have a multi-layered structure where, for example, a plurality of reflection films are formed. In other words, in the bulk layer 102, a reflection film and guiding grooves are not provided for each recording layer unlike a general multi-layered disc.

Therefore, in the state of the structure of the bulk type recording medium 100 illustrated above in FIG. 5, since the marks are not yet formed at the time of recording, focusing servo or tracking servo may not be performed.

For this reason, in an actual case of the bulk type recording medium 100, a reference reflection plane (reference plane) having guiding grooves is provided as illustrated later in FIG. 8.

More specifically, the guiding grooves (position guides) are formed in a spiral shape or a concentric shape on the lower surface side of the cover layer 101 through formation of, for example, pits or grooves, and a selective reflection film 103 is formed thereon. Next, a bulk layer 102 is laminated through an adhesive material, for example, a UV cured resin or the like as an intermediate layer 104 in the figure on the lower layer side of the cover layer 101 where the selective reflection film 103 is formed in this manner.

Herein, through formation of the guiding grooves by the aforementioned pits, grooves, or the like, absolute position information (address information), for example, radial position information, rotational angle information, or the like is recorded. In the hereinafter description, the plane (in this case, the plane where the selective reflection film 103 is formed) where the guiding grooves are formed, and the absolute position information is recorded is referred to as a "reference plane Ref".

In addition, after the bulk type recording medium 100 is formed to have the aforementioned medium structure, as illustrated later in FIG. 9, servo laser light (simply, referred to as servo light) as laser light for position control is illuminated on the bulk type recording medium 100 separately from the laser light (hereinafter, referred to as recording/reproducing laser light or simply recording/reproducing light) for recording (or reproducing) the marks.

As illustrated, the recording/reproducing laser light and the servo laser light are illuminated through a common object lens on the bulk type recording medium 100.

At this time, if the servo laser light reaches the bulk layer 102, the servo laser light may exert an adverse influence on the mark recording in the bulk layer 102. Therefore, in the bulk recording method in the related art, laser light having a wavelength band different from that of the recording/reproducing laser light is used as the servo laser light, and a selective reflection film 103 having a wavelength selectivity of reflecting the servo laser light and transmitting the recording/reproducing laser light is prepared as the reflection film which is formed in the reference plane Ref.

Based on this premise, operations at the time of recording the marks on the bulk type recording medium 100 are described with reference to FIG. 9.

First, when the multi-layered recording is performed on the bulk layer 102 where the guiding grooves or the reflection film are not formed, it is determined in advance which one of the layer positions the marks are to be recorded at in the depth direction of the bulk layer 102. The figure exemplifies the case where a total of five information recording layer positions L, that is, the first information recording layer position L1 to the fifth information recording layer position L5 are set as the layer positions (mark formation layer positions: referred as information recording layer positions) where the marks are formed in the bulk layer 102. As illustrated, the first information recording layer position L1 is the information recording layer position L of the uppermost portion, and after that, the information recording layer positions L are set in the lower layer side in the order of L2→L3→L4→L5.

At the time of recording in the bulk type recording medium where the marks are not yet formed, the focusing servo and the tracking servo based on the reflected light of the recording/reproducing laser light may not be performed with respect to each of the layer positions as a target in the bulk layer 102. Therefore, at the time of recording, the focusing servo control and the tracking servo control of the object lens are performed based on the reflected light of the servo laser light so that the spot position of the servo laser light tracks the guiding grooves on the reference plane Ref.

However, the recording/reproducing laser light is necessarily allowed to reach the bulk layer 102 which is formed on the lower layer side from the reference plane Ref in order to perform the mark recording, and the focus-aligned position is necessarily configured to be selected in the bulk layer 102. Therefore, in this case, the optical system is provided with a recording/reproducing light focusing mechanism for independently adjusting the focus-aligned position of the recording/reproducing laser light separately from the focusing mechanism for the object lens.

Herein, an overview of the optical system which includes the mechanism for independently adjusting the focus-aligned position of the recording/reproducing laser light, as an optical system for performing recording/reproducing with respect to the bulk type recording medium 100, is illustrated in FIG. 10.

In FIG. 10, the object lens illustrated in FIG. 9 is configured so as to be displaceable in the radial direction (tracking direction) of the bulk type recording medium 100 and the direction (focusing direction) of approaching/separating with respect to the bulk type recording medium 100 by a two-axis actuator as illustrated in the figure.

In FIG. 10, the mechanism of independently adjusting the focus-aligned position of the recording/reproducing laser light corresponds to the recording/reproducing light focusing mechanism (expander) in the figure. More specifically, the recording/reproducing light focusing mechanism is configured to include a fixed lens and a movable lens which is supported by a lens driving unit so as to be displaceable in the direction parallel to the optical axis of the recording/reproducing laser light. The collimation of the recording/reproducing laser light incident to the object lens in the figure is changed by driving the movable lens by the lens driving unit, so that the focus-aligned position of the recording/reproducing laser light is adjusted independently of the servo laser light.

In addition, as described above, since the recording/reproducing laser light and the servo laser light have different wavelength bands, in the case, the optical systems corresponding to the recording/reproducing laser light and the servo laser light may be configured so that the reflected lights of the recording/reproducing laser light and the servo laser light from the bulk type recording medium 100 are separated into the corresponding systems (in other words, the reflected lights are independently detected) by the dichroic prism in the figure.

In addition, in the case of considering the forward light, the dichroic prism has a function of combining the recording/reproducing laser light and the servo laser light in the same axis to be incident to the object lens. More specifically, in this case, as illustrated in the figure, after the recording/reproducing laser light is reflected through the expander by a mirror, the recording/reproducing laser light is reflected on the elective reflection plane of the dichroic prism to be incident to the object lens On the other hand, the servo laser light is transmitted through the elective reflection plane of the dichroic prism to be incident to the object lens.

FIG. 11 is a diagram illustrating the servo control at the time of reproducing in the bulk type recording medium 100.

At the time of performing the reproducing in the bulk type recording medium 100 where the mark recording has been already performed, the control of the position of the object lens based on the reflected light of the servo laser light is not necessary unlike the time of recording. In other words, at the time of reproducing, the focusing servo control and the tracking servo control of the object lens based on the reflected light of the recording/reproducing laser light may be performed with respect to the mark sequences as a target, which are formed at the information recording layer position L (referred to an information recording layer L in the case of the time of reproducing) as a reproducing target.

In the bulk recording method having the above configuration, the recording/reproducing laser light for performing the mark recording/reproducing and the servo light as the position control light are illuminated through the common object lens (combining the recording/reproducing laser light and the servo light on the same optical axis) on the bulk type recording medium 100, and after that, at the time of recording, the focusing servo control and the tracking servo control of the object lens are performed so that the servo laser light tracks the position guides of the reference plane Ref, and the focus-aligned position of the recording/reproducing laser light is separately adjusted by the recording/reproducing light focusing mechanism, so that the mark recording may be performed at the necessary position (in the depth direction and in the tracking direction) in the bulk layer 102 even in the case where the guiding grooves are not formed in the bulk layer 102.

In addition, at the time of reproducing, the focusing servo control and the tracking servo control of the object lens which are based on the reflected light of the recording/reproducing laser light are performed so that the focus position of the recording/reproducing laser light tracks the mark sequence which has been already recorded, so that the reproducing of the marks recorded in the bulk layer 102 may be performed.

SUMMARY OF THE INVENTION

However, in the case of employing the configuration of changing the focus-aligned position of the recording/reproducing laser light (information recording position) by the focusing mechanism which is provided separately from the two-axis actuator for driving the object lens as described above, there is a problem in that the information recording position is shifted from an original position due to surface blur of the bulk type recording medium 100 as illustrated in the following FIGS. 12A and 12B.

FIG. 12A illustrates a relationship among a position of the object lens, a position of the reference plane Ref, the information recording layer position Ln as a recording target, and information recording position p-rec (focus-aligned position of the recording/reproducing laser light) in an ideal state where the surface blur does not occurs in the bulk type recording medium 100, and FIG. 12B illustrates a relationship among the above positions in the case where the surface blur (surface blur in the direction of approaching the object lens) occurs.

As described above based on this premise, since the focus-aligned position of the servo laser light is configured to be located on the reference plane Ref by the focusing servo control for the object lens, the distance between the object lens and the reference plane Ref is maintained to be constant. In this case, as illustrated in the figure, since the servo laser light is configured to be incident as the parallel light to the object lens, in the case where the surface blur occurs by d in the direction illustrated in FIG. 12B, the position of the object lens in the focusing direction is shifted by d in the same direction as the direction of occurrence of the surface blur.

On the other hand, the information recording position p-rec is set by driving the movable lens illustrated above in FIG. 10.

As illustrated in FIG. 12A, in the ideal state where the surface blur does not occur, the information recording position p-rec is configured to be aligned with the information recording layer position Ln as a recording target.

Herein, in the case where the surface blur occurs by d as described above, the object lens is driven by d in the same direction as the direction of occurrence of the surface blur so that the focus-aligned position of the servo laser light is aligned with the reference plane Ref. However, although the object lens is driven by d in this manner, the focus-aligned position of the recording/reproducing laser light (information recording position p-rec) is not displaced by d. This is because, in the bulk recording method, the servo laser light and the recording/reproducing laser light are necessarily incident to the object lens at different angles (in this case, as parallel light/non-parallel light) in order to select the focus-aligned position of the recording/reproducing laser light. In other words, this is because, due to the difference of the incident angles with respect to the object lens in this manner, there is a difference between a displacement amount in the focus-aligned position of the servo laser light and a displacement amount in the focus-aligned position of the recording/reproducing laser light through the driving of the same object lens.

According to the occurrence of the surface blur in this manner, defocus (defocus with respect to the information recording layer position Ln as a target) indicated by "δ" in FIG. 12B occurs at the information recording position p-rec (the focus-aligned position of the recording/reproducing laser light)

With respect to the defocus δ, in the case where the surface blur occurs in the direction of approaching the object lens as illustrated in FIG. 12B, the defocus occurs at the forward side (upper layer side) from the information recording layer position Ln as a target, and on the contrary, in the case where the surface blur occurs in the direction of being separated from the object lens, the defocus occurs at the backward side from the information recording layer position Ln as a target.

If the defocus δ of the recording/reproducing laser light occurs according to the surface blur, the information recording positions p-rec of the adjacent layers may be overlapped according to the size of the surface blur or the setting of the layer gaps of the information recording layer positions L. In this case, the recording signal may not be accurately reproduced.

Herein, as one of the methods of avoiding the aforementioned problems related to the defocus δ, the layer gap of each layers is configured to be spaced with the gap equal to or larger than a change in the information recording position p-rec caused by the surface blur.

However, in this method, each layer may not be filled in the focusing direction, and it is very difficult to increase a recording capacity.

In addition, an another method of avoiding the aforementioned problems related to the defocus δ, a system is configured so that a disc is not detachable.

Herein, the surface blur may be caused by disc distortion. However, the disc distortion occurs due to complicated factors like distortion occurring when the disc is clamped by a rotation driving unit or distortion occurring when waste material is inserted in the clamped plane. Therefore, in the case of employing the system where the disc is not detachable, substantially the same influence of the surface blur is exerted to each layer, so that it is possible to avoid the problem in that the recording signals of the layers are overlapped at the time of recording. Therefore, each layer may be filled in the focusing direction, so that it is possible to increase the recording capacity by the filling amount.

However, in this method, since the disc may not be replaced, it is not possible to replace only the disc, for example, in the case of a defective disc. In addition, it is not possible to read out data recorded in a recording apparatus into another recording apparatus. In other words, due to this point, there is loss in convenience.

According to an embodiment of the present invention, there is provided an optical pickup having the following configuration.

In other words, an optical pickup according to the embodiment of the invention includes an optical system having an object lens which illuminates a first light for performing information recording or information reproducing on a recording layer as a target and a second light different from the first light with respect to an optical recording medium, which includes a reference plane having a reflection film and the recording layer which is disposed at a layer position different from that of the reference plane and on which information recording is performed through mark formation according to light illumination, and a focus-aligned position adjusting unit which adjusts a focus-aligned position of the first light through the object lens by changing collimation of the first light incident to the object lens.

In addition, the optical pickup further includes a focusing mechanism which drives the object lens in a focusing direction which is a direction of approaching/separating with respect to the optical recording medium.

In addition, in the case where a depth of focus $\lambda/NA^2$ of the first light, which is defined by a wavelength $\lambda$ of the first light and a numerical aperture NA of the object lens with respect to the first light, is set to $\alpha$ and a maximum surface blur range of the optical recording medium is denoted by D, the optical system is designed so that a use magnification ratio $\beta$ of the object lens with respect to the first light satisfies the following condition.

$$|\beta| \geq \sqrt{(D/\alpha)} \qquad \text{Formula 1}$$

In addition, according to another embodiment of the present invention, there is provided an optical drive apparatus having the following configuration.

In other words, the optical drive apparatus includes an optical pickup including an optical system having an object lens which illuminates a first light for performing information recording or information reproducing on a recording layer as a target and a second light different from the first light with respect to an optical recording medium, which includes a reference plane having a reflection film and the recording layer which is disposed at a layer position different from that of the reference plane and on which information recording is performed through mark formation according to light illumination, and a focus-aligned position adjusting unit which adjusts a focus-aligned position of the first light through the object lens by changing collimation of the first light incident to the object lens and a focusing mechanism which drives the object lens in a focusing direction which is a direction of approaching/separating with respect to the optical recording medium, wherein, in the case where a depth of focus $\lambda/NA^2$ of the first light, which is defined by a wavelength $\lambda$ of the first light and a numerical aperture NA of the object lens with respect to the first light, is set to $\alpha$ and a maximum surface blur range of the optical recording medium is denoted by D, the optical system is designed so that a use magnification ratio $\beta$ of the object lens with respect to the first light satisfies the following condition;

$$|\beta| \geq \sqrt{(D/\alpha)} \qquad \text{Formula 1}$$

In addition, the optical drive apparatus further includes a focusing servo control unit which controls the focusing mechanism so that the focus-aligned position of the second light tracks the reference plane based on a reflected light from the reference plane of the second light.

In addition, the optical drive apparatus further includes focus-aligned position setting control unit which controls the focus-aligned position adjusting unit to perform setting control of the focus-aligned position of the first light.

Herein, the occurring amount of the aforementioned defocus $\delta$ becomes different according to the adjusted state (the changed state of the collimation of the first light incident to the object lens) of the focus-aligned position of the first light (recording/reproducing light) by the focus-aligned position adjusting unit. In other words, the defocus $\delta$ is changed according to the magnification ratio (lateral magnification ratio) with respect to the first light illuminated through the object lens on the optical recording medium.

By taking into consideration these points, according to an embodiment of the invention, in this manner, the use magnification ratio $\beta$ of the object lens by the first light is set so that a relationship between the depth of focus $\alpha$ of the first light and the maximum surface blur range D of the optical recording medium satisfies the aforementioned Formula 1.

Accordingly, the occurring amount of the defocus $\delta$ caused by the surface blur may be suppressed at most within the depth of focus of the first light.

Since the defocus $\delta$ may be suppressed down to a very small value, that is, within the depth of focus in this manner, it is possible to prevent occurrence of the problem in that the information recording positions between the adjacent layers are overlapped due to the surface blur.

According to the present invention, it is possible to suppress the defocus $\delta$ of the first light caused by the surface blur down to a very small value, that is, within the depth of focus.

Therefore, it is possible to prevent occurrence of the problem in that the information recording positions are overlapped between the adjacent layers due to the surface blur, so that it is possible to appropriately reproduce the recording signal.

In addition, since the defocus $\delta$ is configured to be very small in this manner, the gaps between the information recording layer positions may be filled, so that it is possible to implement a large recording capacity.

In addition, if the defocus $\delta$ is configured to be very small, the disc is allowed to be detachable, so that it is possible to prevent deterioration in convenience unlike the case of employing a system such as a hard disc drive (HDD) where a disc is not detachable.

BRIEF DESCRIPTION OF THE DRAWINGS

FIG. 11 is a diagram illustrating servo control at the time of performing reproducing on a bulk type recording medium.

FIGS. 12A and 12B are diagrams illustrating defocus occurring in a recording/reproducing laser light according to surface blur.

DESCRIPTION OF THE PREFERRED EMBODIMENTS

Hereinafter, embodiments for embodying the invention (hereinafter, referred to as embodiments) will be described.

In addition, the description will be made in the following order.

<1. Optical Recording Medium as Recording/Reproducing Target According to Embodiment>
<2. Configuration of Optical Drive Apparatus>
[2-1. Internal Configuration of optical pickup]
[2-2. Internal Configuration of Entire Optical Drive Apparatus]
[2-3. Focus-Aligned Position Setting]
<3. Use Magnification Ratio of Object Lens>
<4. Modified Example>

Figure 1:
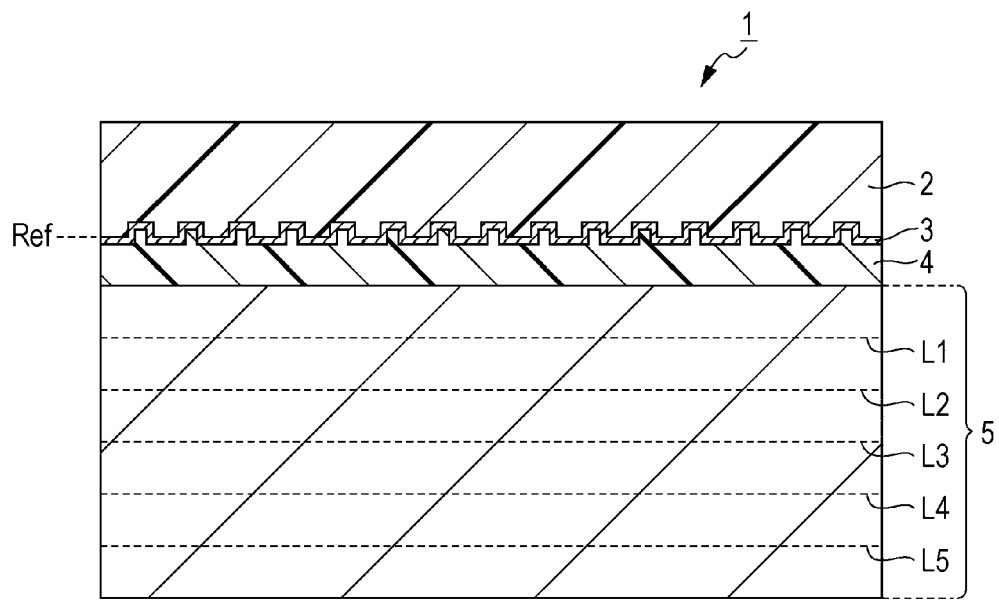
FIG. 1 is a diagram illustrating a cross-sectional structure of an optical disc recording medium as a recording/reproducing target according to an embodiment.

1. Optical Recording Medium as Recording/Reproducing Target According to Embodiment FIG. 1 is a diagram illustrating a cross-sectional structure of an optical disc recording medium as a recording/reproducing target according to an embodiment.

The optical recording medium as a recording/reproducing target according to the embodiment is a so-called bulk recording type optical recording medium, hereinafter, referred to as a bulk type recording medium 1.

The bulk type recording medium 1 is a disc-like optical recording medium Laser light is illuminated on the bulk type recording medium 1 which is driven to rotate, so mark recording (information recording) is performed. In addition, in the reproducing of the recorded information, laser light is also illuminated on the bulk type recording medium 1 which is driven to rotate.

In addition, recording mediums performing recording/reproducing of information through light illumination are collectively called the optical recording medium.

As illustrated FIG. 1, in the bulk type recording medium 1, a cover layer 2, a selective reflection film 3, an intermediate layer 4, and a bulk layer 5 are formed in this order from the upper layer side.

Herein, in the specification, the "upper layer side" denotes an upper layer side of the optical recording medium in the case where the surface of the optical recording medium, where laser light from the optical drive apparatus (recording/reproducing apparatus 10) according to the later-described embodiment is incident, is defined by the upper surface.

In addition, in the specification, the phrase "depth direction" is used. The "depth direction" denotes the direction to be aligned with the upward and downward directions according to the definition of the "upper layer side" (that is, the direction parallel to the incident direction of the laser light from the optical drive apparatus: the focusing direction).

In the bulk type recording medium 1, the cover layer 2 is configured with a resin, for example, polycarbonate, acryl, or the like. As illustrated, guiding grooves as position guides for guiding a recording/reproducing position are formed on the lower surface of the cover layer 2, so that a cross-sectional shape of convex-concave portions is provided as illustrated. The position guides are formed in a spiral shape or a concentric shape. In the case of this example, the hereinafter description will be made under the assumption that the position guides are formed in a spiral shape.

The guiding grooves are formed as continuous grooves or pit strings. For example, in the case where the guiding grooves are formed as the pit strings, position information (absolute position information: rotational angle information, radial position information, or the like as information indicating rotational angle, position on a disc) is recorded according to a combination of pits and land lengths. Otherwise, in the case where the guiding grooves are formed as the grooves, the grooves are formed to be periodically meandered (wobbled). Therefore, the position information is recorded by the information of the period of the meandering.

The cover layer 2 is formed, for example, through injection molding or the like using a stamper where the guiding grooves (convex-concave shape) are formed.

In addition, a selective reflection film 3 is formed on the lower surface side of the cover layer 2 where the guiding grooves are formed.

Herein, as described above, in the bulk recording method, independently of the light (recording/reproducing laser light) for performing the mark recording/reproducing with respect to the bulk layer 5 as the recording layer, the light (servo laser light) for obtaining an error signal of the tracking or the focusing based on the aforementioned guiding grooves is configured to be separately illuminated.

At this time, if the servo laser light reaches the bulk layer 5, the servo laser light may exert an adverse influence on the mark recording in the bulk layer 5. Therefore, a reflection film having a selectivity of reflecting the servo laser light and transmitting the recording/reproducing laser light is necessarily provided.

In the bulk recording method of the related art, the recording/reproducing laser light and the servo laser light are configured to use laser light having different wavelength bands. Therefore, in order to adapt to this configuration, a selective reflection film having a wavelength selectivity of reflecting light having the same wavelength band as those of the servo laser light and transmitting light having the other wavelengths is used as the selective reflection film 3.

The bulk layer 5 as the recording layer is laminated (adhered) through the intermediate layer 4, which is configured with, for example, an adhesive material such as a UV cured resin, on the lower layer side of the selective reflection film 3.

As a forming material (recording material) of the bulk layer 5, an optimized material may be appropriately employed according to the aforementioned employed bulk recording method such as a positive type micro-hologram method, a negative type micro-hologram method, or a void recording method.

In addition, in the invention, the mark recording method with respect to the optical recording medium as the target is not particularly limited, but an arbitrary method may be employed within a range of the bulk recording method In the hereinafter description, the case of employing the void recording method is exemplified.

Herein, in the bulk type recording medium 1 having the aforementioned configuration, the selective reflection film 3 where the position guide as the aforementioned guiding grooves are formed becomes a reflection plane which is a reference of the performing of the position control of the recording/reproducing laser light which is based on the servo laser light as described later. Hereinafter, in this sense, the surface where the selective reflection film 3 is formed is referred to as a reference plane Ref.

As described above in FIG. 9, in the bulk type optical recording medium, in order to perform multi-layer recording in the bulk layer, the positions (information recording layer positions L) of the layers where the information recording is to be performed are defined in advance. In the bulk type recording medium 1, similarly to the above case of FIG. 9, for example, a first information recording layer position L1, a second information recording layer position L2, a third information recording layer position L3, a fourth information recording layer position L4, and a fifth information recording layer position L5 are defined as the information recording layer positions L in this order from the upper layer side.

Herein, information indicating the information recording layer positions L defined in the bulk layer 5 is defined in advance with respect to the controller 39 in the later-described recording/reproducing apparatus 10.

2. Configuration of Optical Drive Apparatus

Figure 2:
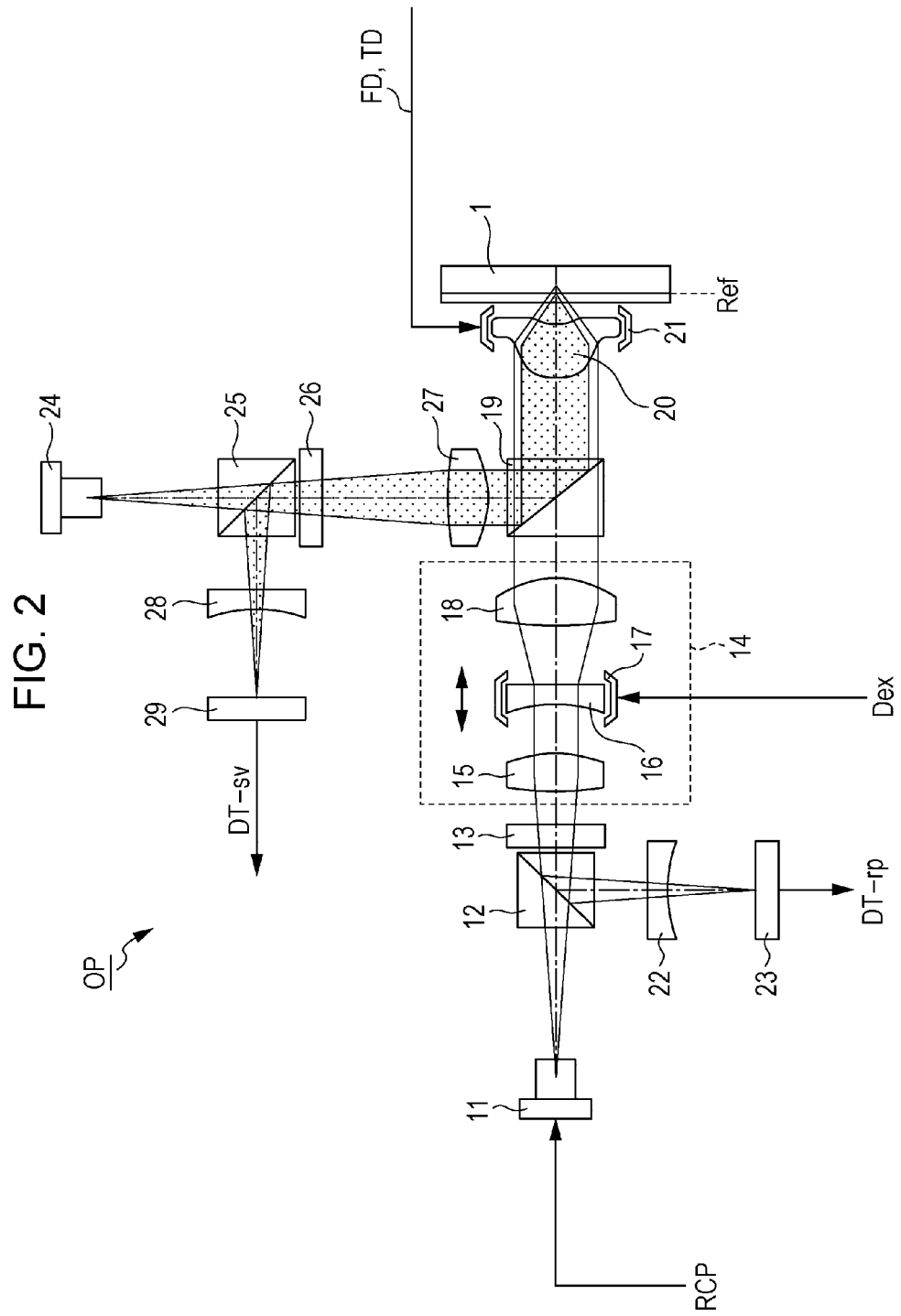
FIG. 2 is a diagram illustrating an internal configuration of an optical pickup included in an optical drive apparatus according to an embodiment.
Figure 3:
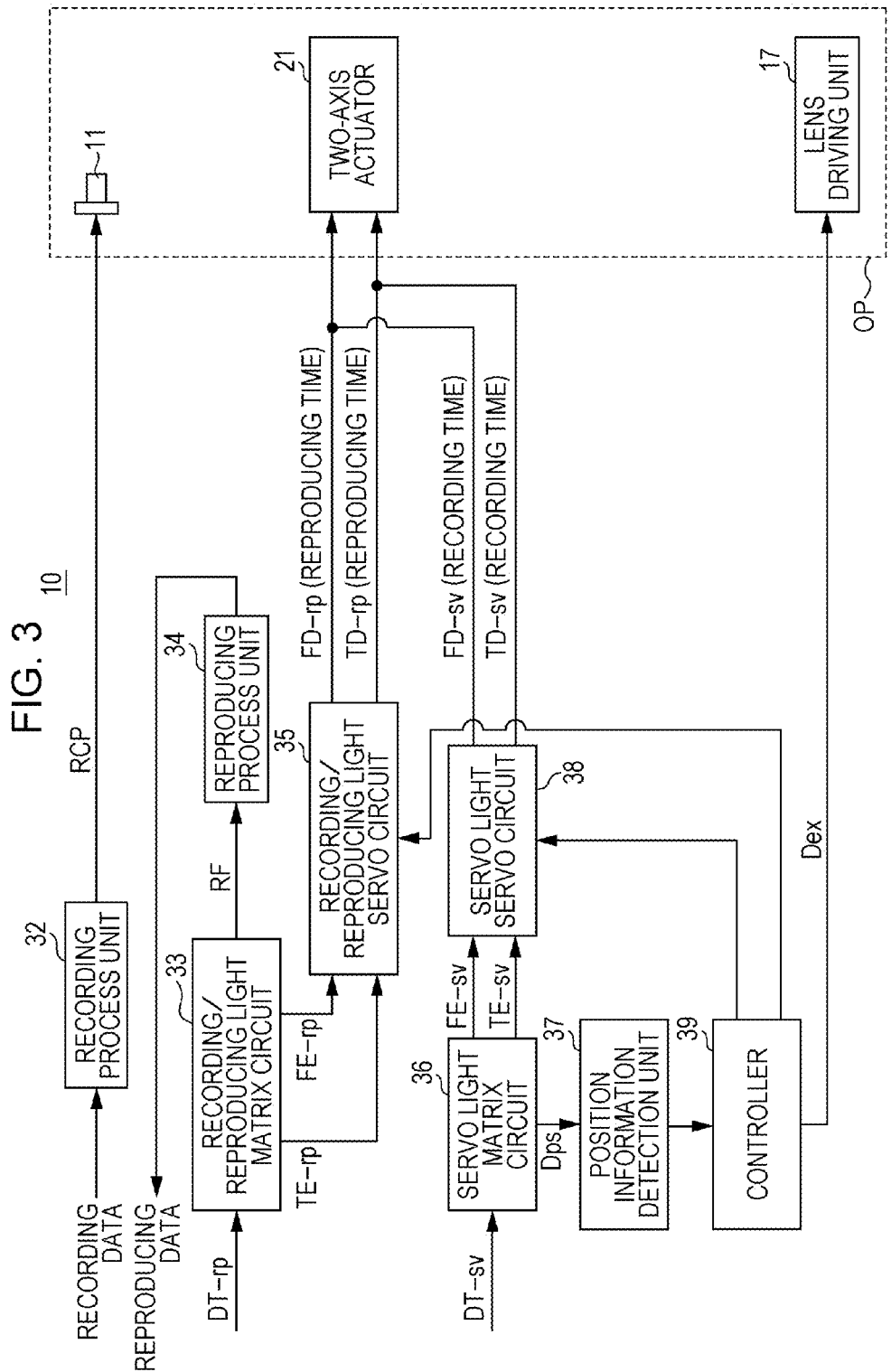
FIG. 3 is a diagram illustrating an entire internal configuration of an optical drive apparatus according to an embodiment.

FIGS. 2 and 3 are diagrams of illustrating an internal configuration of an optical drive apparatus (referred to as a recording/reproducing apparatus 10) as an embodiment of performing recording/reproducing with respect to the bulk type recording medium 1 having the structure illustrated in FIG. 1.

FIG. 2 mainly illustrates the internal configuration of the optical pickup OP included in the recording/reproducing apparatus 10 according to the embodiment FIG. 3 illustrates the entire internal configuration of the recording/reproducing apparatus 10.

[2-1. Internal Configuration of Optical Pickup]

First, the internal configuration of the optical pickup OP is described with reference to FIG. 2.

In the figure, the bulk type recording medium 1 is set at a predetermined position in the recording/reproducing apparatus 10 so that a center hole is clamped, and the bulk type recording medium 1 is supported in a state where the bulk type recording medium 1 may be driven to rotate by a spindle motor (not shown).

The optical pickup OP is disposed so as to illuminate the recording/reproducing laser light and the servo laser light on the bulk type recording medium 1 which is driven to rotate by the spindle motor.

A recording/reproducing laser 11 which is a light source of the recording/reproducing laser light for recording information by using marks and reproducing information recorded by using the marks and a servo laser 24 which is a light source of the servo laser light, which is light for performing position control by using the guiding grooves formed in the reference plane Ref are disposed in the optical pickup OP.

Herein, as described above, the wavelengths of the recording/reproducing laser light and the servo laser light are different from each other. In the case of this example, the wavelength of the recording/reproducing laser light is set to about 405 nm (so-called blue violet laser light), and the wavelength of the servo laser light is set to about 650 nm (red laser light).

In addition, an object lens 20 which becomes an end portion of outputting the recording/reproducing laser light and the servo laser light to the bulk type recording medium 1 is disposed in the optical pickup OP. In addition, a recording/reproducing light receiving portion 23 for receiving a reflected light of the recording/reproducing laser light from the bulk type recording medium 1 and a servo light receiving portion 29 for receiving a reflected light of the servo laser light from the bulk type recording medium 1 are disposed.

Moreover, an optical system which guides the recording/reproducing laser light emitted from the recording/reproducing laser 11 to the object lens 20 and which guides the reflected light of the recording/reproducing laser light, which is incident from the bulk type recording medium 1 to the object lens 20, to the recording/reproducing light receiving portion 23 is disposed in the optical pickup OP.

More specifically, the recording/reproducing laser light emitted from the recording/reproducing laser 11 is incident to the polarizing beam splitter 12 in a state of diverging light. The polarizing beam splitter 12 is configured to transmit the recording/reproducing laser light which is incident from the recording/reproducing laser 11 in this manner.

The recording/reproducing laser light which is transmitted through the polarizing beam splitter 12 is incident through the quarter wavelength plate 13 to the recording/reproducing light focusing mechanism (expander) 14.

As illustrated, the recording/reproducing light focusing mechanism 14 includes a collimator lens 15, a concave lens 16, a lens driving unit 17, and a convex lens 18.

The recording/reproducing laser light through the quarter wavelength plate 13 is incident to the collimator lens 15 in the recording/reproducing light focusing mechanism 14 so as to be transformed into parallel light Next, the recording/reproducing laser light through the collimator lens 15 is emitted through the concave lens 16 and the convex lens 18 to an external portion of the recording/reproducing light focusing mechanism 14.

In the recording/reproducing light focusing mechanism 14, the concave lens 16 is driven in the direction parallel to the optical axis of the recording/reproducing laser light by the lens driving unit 17, so that the focusing control is independently performed with respect to the recording/reproducing laser light.

A driving signal Dex according to the level set corresponding to the information recording layer position L as the target is supplied from the later-described controller 39 (FIG. 3) to the lens driving unit 17. The lens driving unit 17 drives the concave lens 16 based on the driving signal Dex to change the collimation of the recording/reproducing laser light incident to the object lens 20, so that the focus-aligned position of the recording/reproducing laser light is adjusted according to the change in the collimation.

In addition, details of the focus-aligned position setting method using the recording/reproducing light focusing mechanism 14 will be described again later.

The recording/reproducing laser light passing through the recording/reproducing light focusing mechanism 14 is incident to the dichroic prism 19.

The dichroic prism 19 is configured so that the elective reflection plane transmits light having the same wavelength band as that of the recording/reproducing laser light and reflects light having the other wavelengths. Therefore, the recording/reproducing laser light which is incident in the above manner is transmitted through the dichroic prism 19.

As illustrated, the recording/reproducing laser light transmitted through the dichroic prism 19 is illuminated on the bulk type recording medium 1 through the object lens 20.

The object lens 20 is provided with a two-axis actuator 21 which supports the object lens 20 so that the object lens 20 may be displaced in the focusing direction (the direction of approaching/separating with respect to the bulk type recording medium 1) and the tracking direction (the direction perpendicular to the focusing direction: the radial direction of the bulk type recording medium 1).

The two-axis actuator 21 is provided with a focusing coil and a tracking coil, so that the object lens 20 may be displaced in the focusing direction and the tracking direction by applying driving signals (the later-described driving signals FD and TD) to the focusing coil and the tracking coil.

Herein, at the time of reproducing, according to the illumination of the recording/reproducing laser light on the bulk type recording medium 1 in the aforementioned manner, the reflected light of the recording/reproducing laser light may be obtained from the bulk type recording medium 1 (the mark sequence recorded in the information recording layer L which is the reproducing target in the bulk layer 5). In this manner, the obtained reflected light of the recording/reproducing laser light is guided through the object lens 20 to the dichroic prism 19 so as to be transmitted through the dichroic prism 19.

The reflected light of the recording/reproducing laser light which is transmitted through the dichroic prism 19 is incident through the recording/reproducing light focusing mechanism 14 (the convex lens 18→the concave lens 17→the collimator lens 15)→the quarter wavelength plate 13 to the polarizing beam splitter 12.

Herein, In this manner, the polarization direction of the reflected light (backward light) of the recording/reproducing laser light, which is incident to the polarizing beam splitter 12 is different by 90° from that of the recording/reproducing laser light (forward light), which is incident from the side of the recording/reproducing laser light 11 to the polarizing beam splitter 12, due to the function of the quarter wavelength plate 13 and the function at the time of reflection on the bulk type recording medium 1. As a result, the reflected light of the recording/reproducing laser light, which is incident in the aforementioned manner, is reflected on the polarizing beam splitter 12.

In this manner, the reflected light of the recording/reproducing laser light reflected on the polarizing beam splitter 12 is collected through the cylindrical lens 22 on the light receiving plane of the recording/reproducing light receiving portion 23.

In addition, in addition to the configuration of the optical system with respect to the recording/reproducing laser light described above, the optical pickup OP is provided with an optical system which guides the servo laser light emitted from the servo laser 24 to the object lens 20 and which guides the reflected light of the servo laser light, which is incident from the bulk type recording medium 1 to the object lens 20, to the servo light receiving portion 29.

As illustrated, the servo laser light emitted from the servo laser 24 is incident to the polarizing beam splitter 25 in a state of diverging light. The polarizing beam splitter 25 is configured so as to transmit the servo laser light (forward light) which is incident from the servo laser 24 in this manner.

The servo laser light which is transmitted through the polarizing beam splitter 25 passes through the quarter wavelength plate 26 and is allowed to be parallel light by the collimator lens 27, and after that, is incident to the dichroic prism 19.

As described above, since the dichroic prism 19 is configured so as to transmit light having the same wavelength band as that of the recording/reproducing laser light and reflect light having the other wavelengths, the servo laser light is reflected by the dichroic prism 19 and is illuminated on the bulk type recording medium 1 through the object lens 20.

In addition, the reflected light of the servo laser light (the reflected light from the reference plane Ref) obtained through the illumination of the servo laser light on the bulk type recording medium 1 in this manner is reflected through the object lens 20 by the dichroic prism 19 and, after that, is incident through the collimator lens 27→the quarter wavelength plate 26 to the polarizing beam splitter 25.

Similarly to the case of the aforementioned recording/reproducing laser light, the polarization direction of the reflected light (backward light) of the servo laser light, which is incident from the side of the bulk type recording medium 1 in this manner, is different by 90° from that of the forward light due to the function of the quarter wavelength plate 26 and the function at the time of reflection on the bulk type recording medium 1. Therefore, as the backward light, the reflected light of the servo laser light is reflected on the polarizing beam splitter 25.

The reflected light of the servo laser light reflected on the polarizing beam splitter 25 is collected through the cylindrical lens 28 on the light receiving plane of the servo light receiving portion 29.

Herein, although description with reference to the drawings is omitted, in an actual recording/reproducing apparatus 10, a slide driving unit which drives the entire optical pickup OP described above to slide in the tracking direction is disposed, and due to the driving of the optical pickup OP by the slide driving unit, the laser light illuminated position may be displaced in a wide range.

[2-2. Internal Configuration of Entire Optical Drive Apparatus]

An internal configuration of the entire recording/reproducing apparatus 10 is illustrated in FIG. 3.

In addition, in FIG. 3, only a portion of the internal configuration of the optical pickup OP is extracted and illustrated.

In FIG. 3, the recording/reproducing apparatus 10 is provided with a recording processing unit 32, a recording/reproducing light matrix circuit 33, a reproducing processing unit 34, a recording/reproducing light servo circuit 35, a servo light matrix circuit 36, a position information detection unit 37, and a servo light servo circuit 38 in the figure as a configuration of a signal processing system for performing recording/reproducing on the bulk layer 5 and performing focusing/tracking control of the object lens 20 at the time of mark recording/reproducing.

The recording processing unit 32 is input with data (recording data) which are to be recorded in the bulk type recording medium 1. The recording processing unit 32 obtains a recording modulated data sequence, for example, a binary data sequence of "0" and "1" actually recorded in the bulk type recording medium 1 by performing addition of an error correction code or predetermined recording modulating and encoding on the input recording data.

In the manner, the recording processing unit 32 drives light emission of the recording/reproducing laser 11 in the optical pickup OP by a recording pulse RCP which is based on the generated recording modulated data sequence.

The recording/reproducing light matrix circuit 33 includes a current-voltage conversion circuit, a matrix calculation/amplification circuit, and the like corresponding to light receiving signals DT-rp (output currents) from a plurality of light receiving elements as the recording/reproducing light receiving portion 23 illustrated in FIG. 2 to generate signals necessary for a matrix calculation process.

More specifically, the recording/reproducing light matrix circuit 33 generates a high frequency signal (hereinafter, referred to as a reproducing signal RF) corresponding to a reproducing signal reproducing the aforementioned recording modulated data sequence, a focusing error signal FE-rp for the focusing servo control, and a tracking error signal TE-rp for the tracking servo control.

The reproducing signal RF generated by the recording/reproducing light matrix circuit 33 is supplied to the reproducing processing unit 34.

In addition, the focusing error signal FE-rp and the tracking error signal TE-rp are supplied to the recording/reproducing light servo circuit 35.

The reproducing processing unit 34 performs a reproducing process such as a binarization process or a decoding/error correction process for recording modulated codes for recovering the aforementioned recording data on the reproducing signal RF, so that the reproducing data reproducing the recording data is obtained.

In addition, the recording/reproducing light servo circuit 35 generates the focusing servo signal FS-rp and the tracking servo signal TS-rp based on the focusing error signal FE-rp and the tracking error signal TE-rp supplied from the matrix circuit 33 and drives the focusing coil and the tracking coil of the two-axis actuator 21 based on the focusing driving signal FD-rp and the tracking driving signal TD-rp which are based on the focusing servo signal FS-rp and the tracking servo signal TS-rp, so that the focusing servo control and the tracking servo control with respect to the recording/reproducing laser light is implemented.

Figure 9:
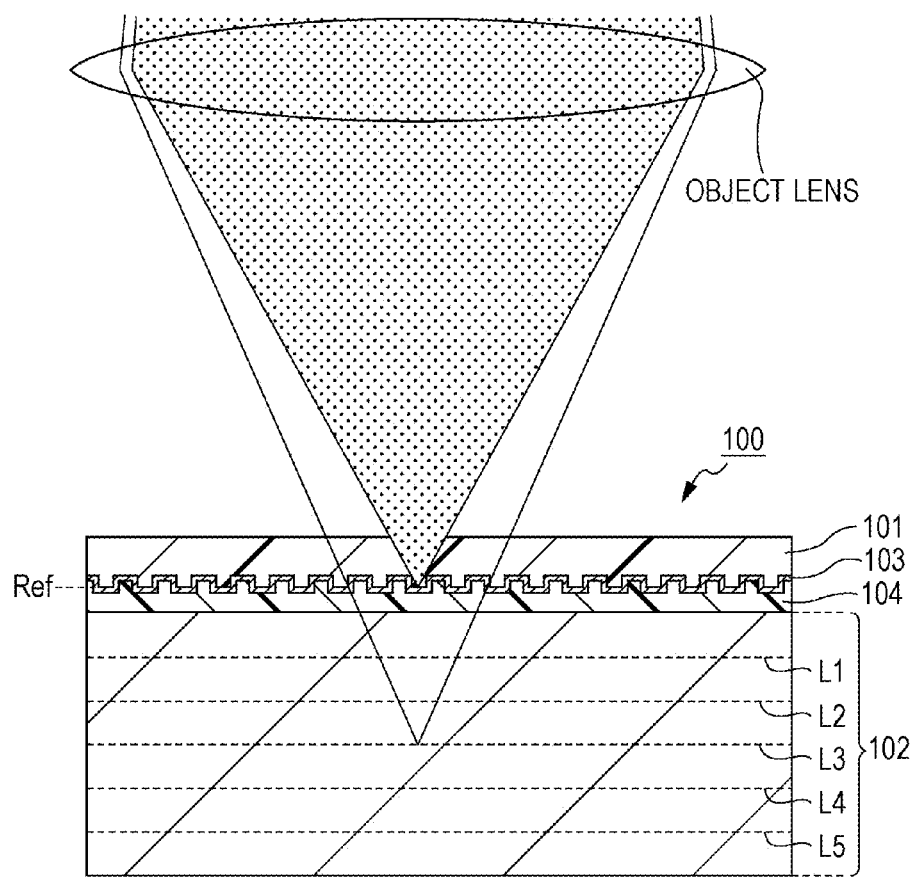
FIG. 9 is a diagram illustrating operations at the time of recording a mark on a bulk type recording medium.
Figure 10:
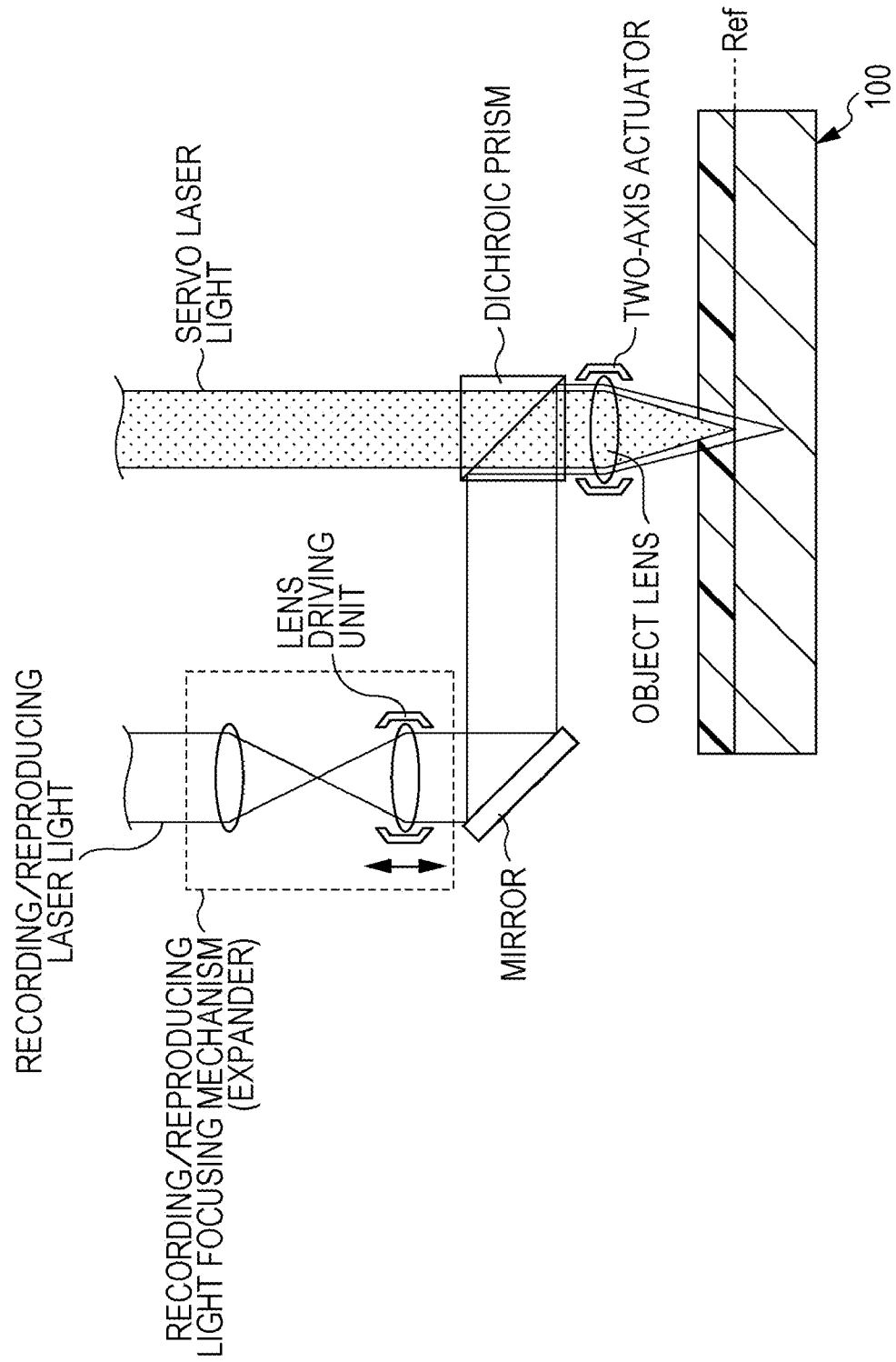
FIG. 10 is a diagram illustrating an overview of an optical system for performing recording/reproducing on a bulk type recording medium.

In addition, as understood from the above description of FIGS. 9 to 11, the servo control of the two-axis actuator 21 (the object lens 20) based on the reflected light of the recording/reproducing laser light is performed at the time of reproducing.

In addition, the recording/reproducing light servo circuit 35 implements the track jump operation or performs the tracking servo lead-in control or the like by applying a jump pulse to the tracking coil by turning off the tracking servo loop in response to the command performed by the controller 39 corresponding to the time of reproducing. In addition, the recording/reproducing light servo circuit 35 also performs the focusing servo lead-in control or the like.

In addition, in a signal process system for the reflected light of the servo laser light, the servo light matrix circuit 36 generates necessary signals based on the light receiving signals DT-sv from a plurality of light receiving elements in the servo light receiving portion 29 illustrated in FIG. 2.

More specifically, the servo light matrix circuit 36 generates the focusing error signal FE-sv and the tracking error signal TE-sv for servo control of the focusing/tracking.

In addition, a position information detection signal Dps for detecting the absolute position information (address information) recorded on the reference plane Ref is generated For example, in the case where the absolute position information is recorded by a pit string, a sum signal is generated as the position information detection signal Dps. Otherwise, in the case where the absolute position information is recorded by wobbling grooves, a push-pull signal is generated as the position information detection signal Dps.

The position information detection signal Dps is supplied to the position information detection unit 37. The position information detection unit 37 detects the absolute position information recorded on the reference plane Ref based on the position information detection signal Dps. The detected absolute position information is supplied to the controller 39.

In addition, the focusing error signal FE-sv and the tracking error signal TE-sv generated by the servo light matrix circuit 36 are supplied to the servo light servo circuit 38.

The servo light servo circuit 38 generates a focusing servo signal FS-sv and a tracking servo signal TS-sv based on the focusing error signal FE-sv and the tracking error signal TE-sv.

Next, at the time of recording, the servo light servo circuit 38 drives the focusing coil and the tracking coil of the two-axis actuator 21 based on the focusing driving signal FD-sv and the tracking driving signal TD-sv, which are generated based on the focusing servo signal FS-sv and the tracking servo signal TS-sv, in response to the command from the controller 39, so that the focusing servo control and the tracking servo control with respect to the servo laser light is implemented.

In addition, the servo light servo circuit 38 implements the track jump operation or performs the tracking servo lead-in control or the like by applying a jump pulse to the tracking coil of the two-axis actuator 21 by turning off the tracking servo loop in response to the command performed by controller 39 corresponding to the time of recording. In addition, the servo light servo circuit 38 also performs the focusing servo lead-in control or the like with respect to the reference plane Ref.

The controller 39 is configured with, for example, a microcomputer having a CPU (Central Processing Unit) and a memory (storage unit) such as a ROM (Read Only Memory) or a RAM (Random Access Memory). The controller 39 performs controlling the entire the recording/reproducing apparatus 10, for example, by performing control and processes according to a program stored in the ROM or the like.

More specifically, the controller 39 performs setting of the focus-aligned position of the recording/reproducing laser light by driving and controlling the lens driving unit 17 in the recording/reproducing light focusing mechanism 14 based on the information of the information recording layer positions L which are set in advance as described above.

In addition, the detailed method of setting the focus-aligned positions will be described later.

In addition, the controller 39 also performs control for implementing the servo control change of the object lens 20 at the time of recording/reproducing as described above in FIGS. 9 to 11. More specifically, at the time of recording, the controller 39 commands the servo light servo circuit 38 to output the focusing driving signal FD-sv and the tracking driving signal TD-sv and commands the recording/reproducing light servo circuit 35 to stop outputting the focusing driving signal FD-rp and the tracking driving signal TD-rp.

On the other hand, at the time of reproducing, the controller 39 commands the recording/reproducing light servo circuit 35 to output the focusing driving signal FD-rp and the tracking driving signal TD-rp and commands the servo light servo circuit 38 to stop outputting of the focusing driving signal FD-sv and the tracking driving signal TD-sv.

In addition, the controller 39 performs seek operation control on the servo light servo circuit 38. In other words, the controller 39 commands the servo circuit 38 to move the spot position of the servo laser light to a predetermined address on the reference plane Ref.

[2-3. Focus-Aligned Position Setting]

Figure 4:
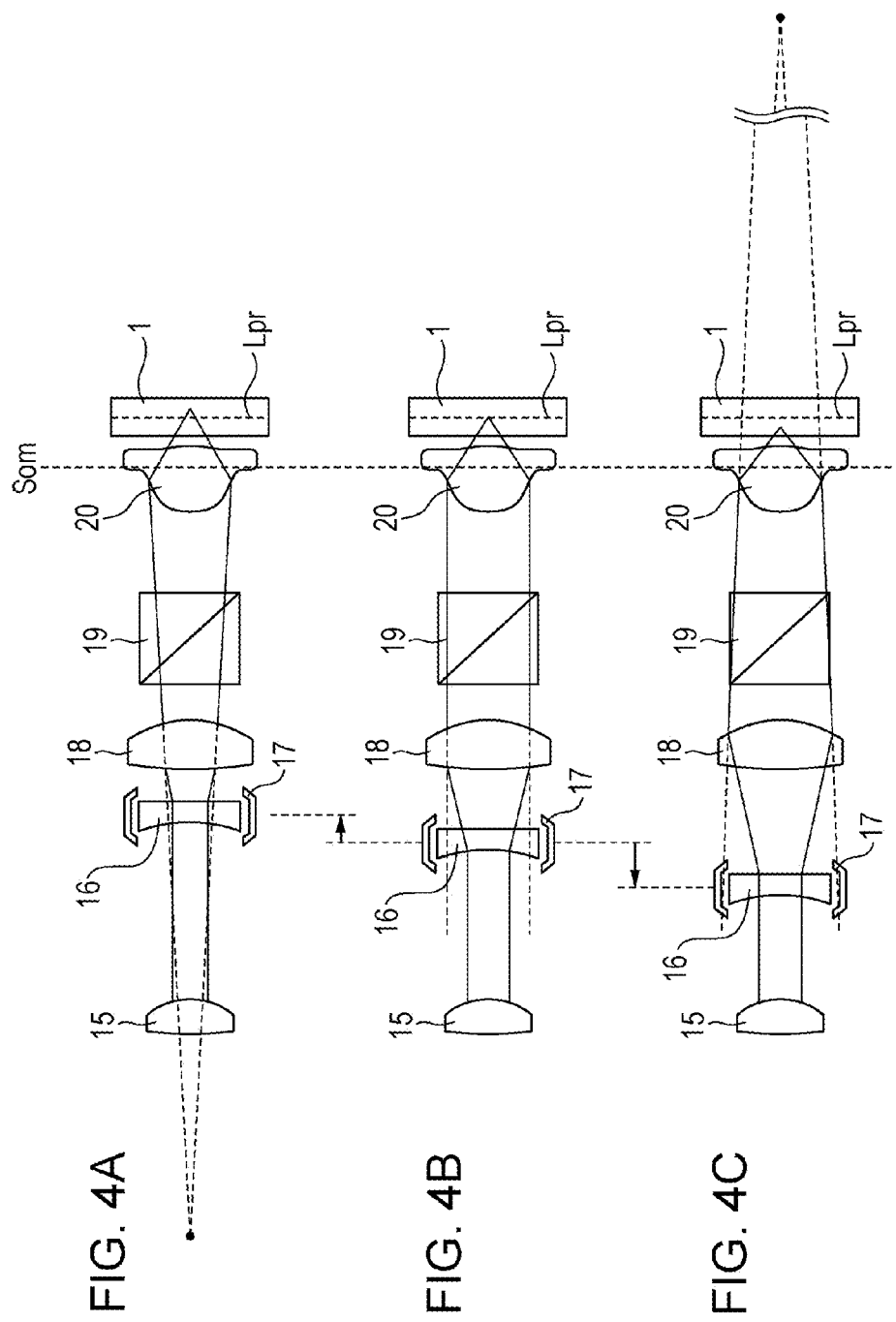
FIGS. 4A to 4C are diagrams illustrating a focus-aligned position setting method using a recording/reproducing light focusing mechanism.
Figure 5:
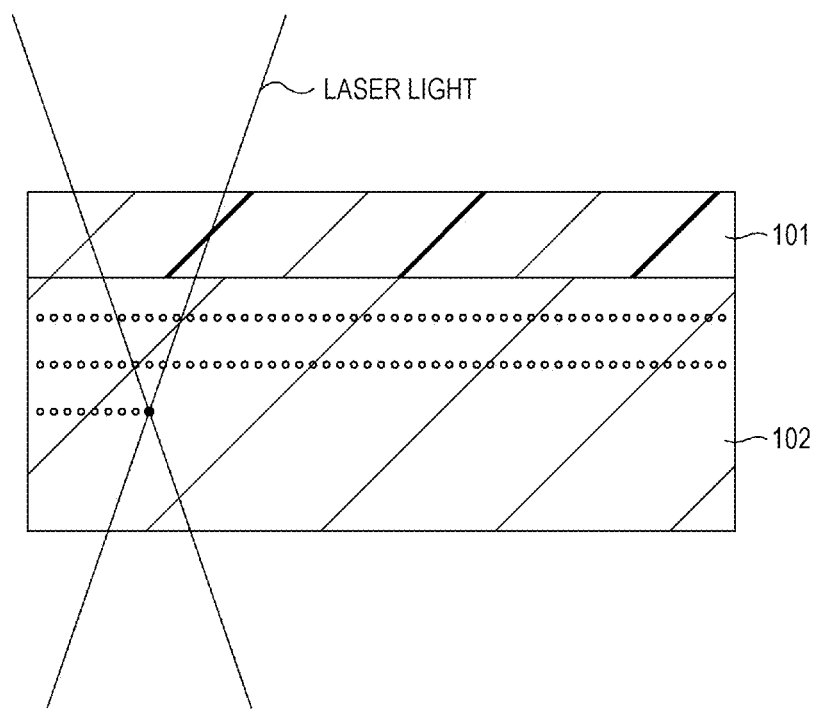
FIG. 5 is a diagram illustrating a bulk recording method.
Figure 6A:
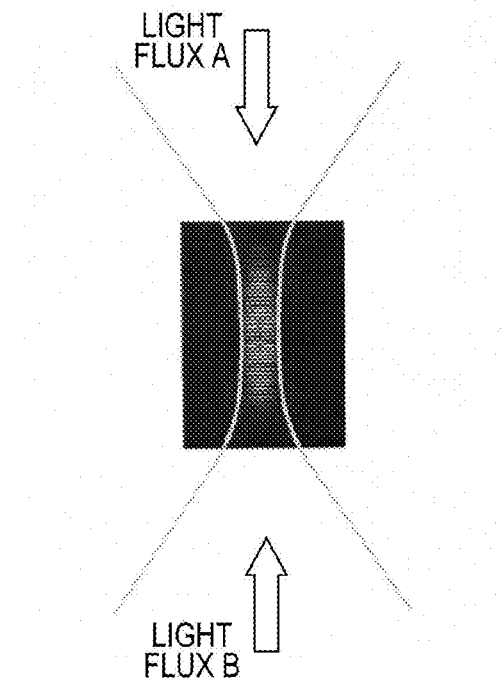
FIGS. 6A and 6B are diagrams illustrating a micro-hologram method.
Figure 6B:
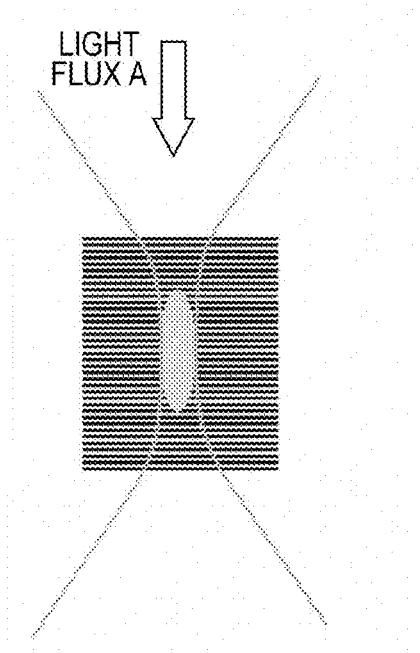
Figure 7A:
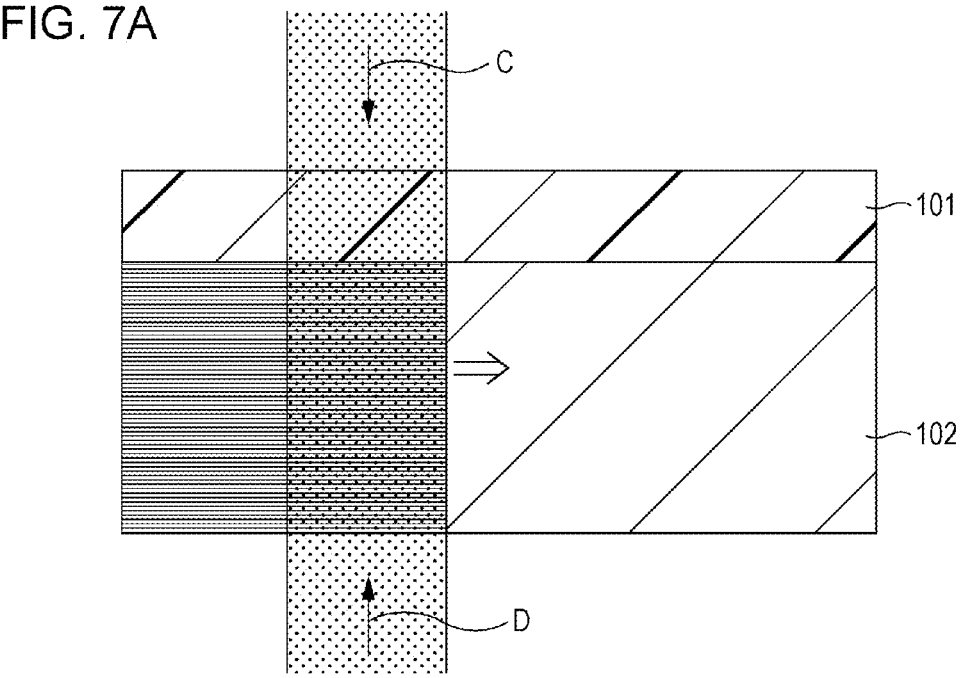
FIGS. 7A and 7B are diagrams illustrating a negative type micro-hologram method.
Figure 7B:
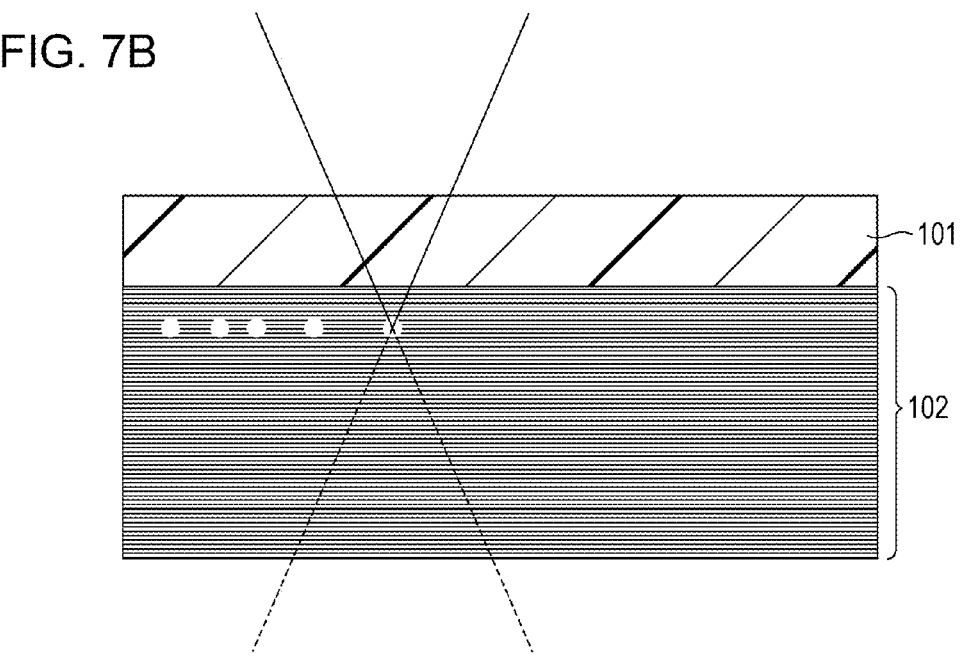
Figure 8:
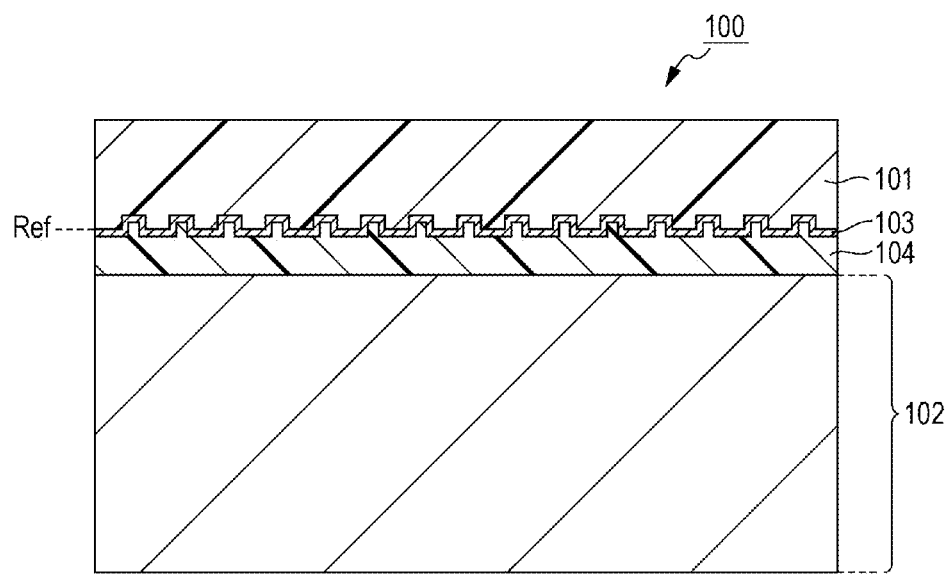
FIG. 8 is a diagram illustrating an example of a cross-sectional structure of a real bulk type recording medium having a reference plane.

FIG. 4 is a diagram illustrating the focus-aligned position setting method using the recording/reproducing light focusing mechanism 14.

First, at the time of performing recording at the necessary layer position of the bulk type recording medium 1, a reference layer position Lpr is set in advance. The reference layer position Lpr is a layer position which becomes a reference for setting (adjusting) the focus-aligned position of the recording/reproducing laser light. More specifically, in the case of this example, the information recording layer position L3 located at a central position among the information recording layer positions L1 to L5 is set as the reference layer position Lpr.

In this case, the recording/reproducing light focusing mechanism 14 performs adjustment of the focus-aligned position of the recording/reproducing laser light by using the focus-aligned state of the reference layer position Lpr as a reference.

More specifically, in this case, the optical system with respect to the recording/reproducing laser light is designed so that the driving position of the concave lens 16 by the lens driving unit 17 is located at the reference position in the state where the focus-aligned position of the recording/reproducing laser light is located at the reference layer position Lpr as illustrated in FIG. 4B. More specifically, in this case, the reference position of the concave lens 16 denotes the state where the level of the driving signal Dex applied to the lens driving unit 17 is zero level.

In addition, in this case, the optical system is designed so that the recording/reproducing laser light, which is emitted from the concave lens 16 through the convex lens 18 (that is, incident to the object lens 20) becomes parallel light as illustrated in the figure in the state where the concave lens 16 is located at the reference position in this manner.

In the case where the focus-aligned position of the recording/reproducing laser light is set at the information recording layer position L of the lower layer side from the reference layer position Lpr (in this case, the information recording layer position L3) by using the state illustrated in FIG. 4B as a reference, the concave lens 16 is driven in the direction of approaching to the object lens 20 (for example, a positive polarity signal as the driving signal Dex is applied) as illustrated in FIG. 4A. Therefore, the recording/reproducing laser light incident to the object lens 20 becomes diverging light, and as a result, the focus-aligned position of the recording/reproducing laser light is adjusted to the lower layer side from the reference layer position Lpr.

At this time, the diverging angle of the recording/reproducing laser light incident to the object lens 20 becomes large in proportion to the driving amount of the concave lens 16 from the reference position, so that the focus-aligned position of the recording/reproducing laser light is adjusted to the lower layer side from that of the reference layer position Lpr.

On the other hand, in the case where the focus-aligned position of the recording/reproducing laser light is set at the information recording layer position L of the upper layer side from the reference layer position Lpr, the concave lens 16 is driven in the direction of separating from the object lens 20 (in the direction of the light source side) (for example, a negative polarity signal as the driving signal Dex is applied), so that the recording/reproducing laser light incident to the object lens 20 is transformed into converging light as illustrated in FIG. 4C. Therefore, the focus-aligned position of the recording/reproducing laser light is adjusted to the upper layer side from the reference layer position Lpr. At this time, as the driving amount of the concave lens 16 from the reference position becomes larger, the converging angle of the recording/reproducing laser light incident to the object lens 20 becomes larger. Therefore, the focus-aligned position of the recording/reproducing laser light is adjusted to the further upper side.

Based on this premise, the controller 39 illustrated above in FIG. 3 stores the information of the level of the driving signal Dex for each information recording layer position L as the information indicating each the information recording layer position L. The controller 39 drives and controls the lens driving unit 17 according to the information of the level which is set in advance for each layer position L in this manner. Therefore, the position of the concave lens 16 may be shifted to the position corresponding to the information recording layer position Ln which is to be the object of recording, so that the information recording position by the recording/reproducing laser light may be adjusted at an arbitrary information recording layer position L.

3. Use Magnification Ratio of Object Lens

Herein, as understood from the above description, in the recording/reproducing apparatus 10 according to the embodiment at the time of performing recording with respect to the bulk type optical recording medium, the following operations are performed.

The recording/reproducing laser light and the servo laser light are illuminated through the common object lens.

The focusing servo control of the object lens is performed so that the servo laser light is focus-aligned on the reflection film formed in the optical recording medium.

The information recording position (focus-aligned position) by the recording/reproducing laser light is set (adjusted) by changing the collimation of the recording/reproducing laser light incident to the object lens.

In the case where the aforementioned configuration is employed, according to the theory described above in FIG. 12, the defocus δ from the information recording layer position Ln as a target occurs in the recording/reproducing laser light according to the surface blur of the bulk type recording medium 1.

Herein, the defocus δ illustrated in FIG. 12 is changed according to the magnification ratio (lateral magnification ratio) of the optical system for the recording/reproducing laser light. In other words, the occurring amount of the defocus δ is changed according to which one of the information recording layer positions L the recording/reproducing laser light is focus-aligned on.

If stated for confirmation, as seen from the object lens illustrated in FIG. 12, when the distance between the object point OB of the recording/reproducing laser light and the object lens main plane Som is denoted by S1 and the distance from the object lens main plane Som to the image point (the focus-aligned position of the recording/reproducing laser light) is denoted by S2, the magnification ratio (denoted by β) of the optical system for the recording/reproducing laser light is expressed by the following Formula 2.

$$\beta = S1/S2 \qquad \text{Formula 2}$$

In addition, herein, the object-side main plane and the image-side main plane of the object lens are set to the same Som.

If the focus-aligned position of the recording/reproducing laser light is changed by the recording/reproducing light focusing mechanism 14 (the concave lens 16 is driven), the relationship between the object point OB and the image point is changed, so that the relationship between the distance S1 and the distance S2 is also changed. Therefore, the magnification ratio β is changed according to which one of the information recording layer positions L the recording/reproducing laser light is focus-aligned.

At this time, the occurring amount of the surface blur is denoted by d, the relationship between the magnification ratio β and the defocus δ is more specifically expressed by the following Formula 3.

$$\delta = d/\beta^2 \qquad \text{Formula 3}$$

As shown in Formula 3, the defocus δ is changed according to the magnification ratio β.

Herein, if the occurring amount of the defocus δ according to the surface blur may be negligibly small, the shift of the information recording position p-rec according to the defocus δ may be negligibly small. In addition, according to the above Formula 3, the value of the defocus δ may be suppressed by allowing the magnification ratio β to be larger.

By taking into consideration this point, in the embodiment, the method of setting the magnification ratio β is employed so that the defocus δ according to the surface blur is equal to or smaller than the depth of focus of the recording/reproducing laser light.

If stated for confirmation, in the case where the wavelength of the recording/reproducing laser light is denoted by λ and the numerical aperture of the object lens 20 (the numerical aperture with respect to the recording/reproducing laser light) is denoted by NA, the depth of focus of the recording/reproducing laser light is expressed by the following formula.

$$\lambda/NA^2 \qquad \text{Formula 4}$$

According to the Formula 3, it may be understood that the following formula is satisfied in order to suppress the defocus δ according to the surface blur down to the depth of focus or less.

$$\lambda/NA^2 d/\beta^2 \qquad \text{Formula 5}$$

At this time, with respect to the occurring amount d of the surface blur, the maximum range D thereof may be considered. More specifically, for example, an allowable maximum surface blur range defined by the standard of the bulk type recording medium 1 may be considered.

In this manner, the maximum range of the surface blur is denoted by D, and the depth of focus $\lambda/NA^2$ is denoted by α, the above Formula 5 is rewritten by the following Formula 6.

$$\alpha \geq D/\beta^2 \qquad \text{Formula 6}$$

By solving Formula 6 with respect to β, the following Formula 1 is obtained.

$$|\beta| \geq \sqrt{(D/\alpha)} \qquad \text{Formula 1}$$

In other words, in order to suppress the defocus δ down to the depth of focus α or less, it is preferable that the condition where the absolute value of the magnification ratio β is equal to or larger than square root of D/α is satisfied.

In the embodiment, in the optical pickup OP illustrated in FIG. 2, the optical system for the recording/reproducing laser light inside the optical pickup OP is designed so as to satisfy the condition of the above Formula 1. In other words, the optical system is designed so that, even in the state where any one of the information recording layer positions L is selected by the recording/reproducing light focusing mechanism 14, the condition of the above Formula 1 with respect to the magnification ratio β is satisfied. In other words, it may be stated that the optical system is designed so that the use magnification ratio of the object lens by the recording/reproducing laser light satisfies the condition of the above Formula 1.

Since the optical system is designed in this manner, the occurring amount of the defocus δ during the recording operation is completely suppressed down to the depth of focus α or less.

Since the occurring amount of the defocus δ is suppressed down to a very small value of the depth of focus α or less, it is possible to prevent occurrence of the problem in that the information recording positions p-rec are overlapped between the adjacent layers due to the surface blur, so that it is possible to appropriately reproduce the recording signal.

In addition, since the occurring amount of the defocus δ is suppressed down to a very small value, the layer gaps between the information recording layer positions L may be filled, so that it is possible to implement a large recording capacity.

In addition, if the occurring amount of the defocus δ is suppressed down to a very small value, the bulk type recording medium 1 is configured to be detachable, so that it is possible to prevent deterioration in convenience unlike the case of employing a system such as a hard disc drive (HDD) where a disc is not detachable.

In addition, in the case of this example, the numerical aperture NA=0.85, and the wavelength λ=405 nm, so that the depth of focus α=0.56 μm. At this time, if the maximum surface blur range D is 0.1 mm (for example, ±0.05 mm), the absolute value of β may be set to be about 13 or more (13 or more times).

If stated for confirmation, it is preferable that the absolute value of the magnification ratio β is larger because the defocus δ becomes smaller. By taking into consideration this point, in the example, the optical system is designed so that, for example, $|\beta| \geq 25$.

Herein, as described above with reference to FIG. 4, in the embodiment, the adjustment of the focus-aligned position with respect to the information recording layer positions L is configured to be performed by changing the recording/reproducing laser light incident to the object lens 20 to the converging light/diverging light by using the parallel light (β=∞) as a reference state.

According to the configuration, it is possible to allow the absolute value of the magnification ratio β to be large, so that it is possible to more advantageously implement the design of the optical system where the defocus δ becomes small.

As described above, the magnification ratio β is defined to be a ratio (β=S1/S2) of the distance S1 between the object point OB of the recording/reproducing laser light as seen from the object lens 20 and the main plane Som of the object lens 20 to the distance S2 between the main plane Som of the object lens 20 and the image point of the recording/reproducing laser light.

Herein, for example, as illustrated in FIG. 4A, by considering the magnification ratio β in the state where the setting of the focus-aligned position is performed by allowing the recording/reproducing laser light to be incident as the diverging light to the object lens 20, in this case, the object point OB of the recording/reproducing laser light as seen from the object lens 20 may be the position indicated by the black circle in the figure. At this time, the distance S1 has a positive value.

If the concave lens 16 is further driven from the state illustrated in FIG. 4A to the side of the object lens 20 (in other words, the diverging angle of the recording/reproducing laser light becomes lager: the information recording layer position L of the further lower layer side is selected), the value of the distance S1 becomes smaller On the other hand, the value (a positive value) of the distance S2 becomes larger.

As understood therefrom, in the case where the adjustment of the focus-aligned position is performed by allowing the recording/reproducing laser light to be incident as the diverging light to the object lens 20 and by adjusting the diverging angle, the value of the magnification ratio β is changed to become small as the diverging angle becomes larger and the layer position of the further lower layer side is selected. In other words, as the recording/reproducing laser light becomes closer to the parallel light by allowing the diverging angle to be smaller (as the layer position of the further upper layer side is selected), the value of the magnification ratio β is changed to be large.

On the other hand, as illustrated in FIG. 4C, in the case where the recording/reproducing laser light is incident as the converging light to the object lens 20, the object point OB of the recording/reproducing laser light as seen from the object lens 20 may be the position indicated by the black circle in the figure. At this time, the distance S1 has a negative value.

If the concave lens 16 is further driven from the state illustrated in FIG. 4B to the side being separated from the object lens 20 (the converging angle of the recording/reproducing laser light becomes larger: the layer position of the further upper layer side is selected), the value (absolute value) of the distance S1 becomes smaller On the other hand, the value (a positive value) of the distance S2 becomes larger.

Therefore, even in the case where the adjustment of the focus-aligned position is performed by allowing the recording/reproducing laser light to be incident as the converging light to the object lens 20 and by adjusting the converging angle, as the converging angle becomes larger (the layer position of the further upper layer side is selected), the value (absolute value) of the magnification ratio β becomes smaller On the contrary, as the recording/reproducing laser light becomes closer to the parallel light by allowing the converging angle to be smaller (as the layer position of the further lower layer side is selected), the value (absolute value) of the magnification ratio β becomes larger.

As understood from the above description, according to the embodiment where the adjustment of the focus-aligned position with respect to the information recording layer positions L is performed by changing the recording/reproducing laser light incident to the object lens 20 to the converging light/diverging light by using the parallel light (β=∞) state as a reference state, it is possible to set the absolute value of the magnification ratio β to be larger, so that it is possible to more advantageously implement the design of the optical system where the defocus δ becomes small.

Herein, in the embodiment, since the information recording layer position L3 located at the central position in the bulk layer 5 is set as the reference layer position Lpr, it is possible to suppress the changing width of the magnification ratio β, which corresponds to the performing of layer section from the information recording layer position L1 of the uppermost portion to the information recording layer position L5 of the lowermost portion, down to a minimum width. In other words, according to the above configuration, it is possible to most advantageously implement the design of the optical system where the defocus δ becomes small.

If stated for confirmation, the most disadvantageous case in the implementation of the design of the optical system where the defocus δ becomes small is, for example, the case where the reference layer position Lpr is set at the information recording layer position L1 of the uppermost portion or the information recording layer position L5 of the lowermost portion and the recording/reproducing laser light incident to the object lens 20 is changed in only the range of from the parallel light to the spreading light or only the range of from the parallel light to the converging light, so that the focus-aligned position is adjusted.

Therefore, in order to more advantageously implement the design of the optical system where the defocus δ becomes small in comparison with the aforementioned state, at least, the recording/reproducing laser light is configured to be incident as the converging light to the object lens 20 in the state where the focus-aligned position of the recording/reproducing laser light is adjusted to the information recording layer position L1 of the uppermost portion, and the recording/reproducing laser light is configured to be incident as the diverging light to the object lens 20 in the state where the focus-aligned position of the recording/reproducing laser light is adjusted to the information recording layer position L5 of the lowermost portion.

In other words, the adjustment of the focus-aligned position with respect to a target of from the information recording layer position L1 of the uppermost portion to the information recording layer position L5 of the lowermost portion in the bulk layer 5 may be performed by changing the recording/reproducing laser light incident to the object lens 20 to the converging light/diverging light by using the parallel light state as a reference state.

4. Modified Example

Hereinbefore, although the embodiments of the invention are described, the invention is not limited to the specific examples described hereinbefore.

For example, in the hereinbefore description, the case where the number of the information recording layer positions L set in the bulk layer 5 is five is exemplified. However, for example, several tens of the information recording layer positions L may be set, and the number thereof is not limited to a specific number.

In addition, in the hereinbefore description, at the time of reproducing, the focusing control for the recording/reproducing laser light is performed by controlling the object lens 20 based on the reflected light from the mark sequence where the recording of the recording/reproducing laser light is completed. However, similarly to the time of recording, at the time of reproducing, the focusing control for the object lens 20 may be performed based on the reflected light from the reference plane Ref of the servo laser, and the focusing control for the recording/reproducing laser light may be performed by using the recording/reproducing light focusing mechanism 14.

Herein, in the case where the focusing control is performed in this manner at the time of reproducing similarly to the time of recording, at the time of reproducing, there is a shift in the focus-aligned position of the recording/reproducing laser light with respect to the mark sequence, where the recording is completed, according to the defocus δ caused by the surface blur, so that it is not possible to appropriately perform the information reproducing. However, according to the setting of the magnification ratio β according to the embodiment, similarly to the time of recording, the defocus δ is suppressed down to a very small value, that is, within the depth of focus (in other words, the state where the recording/reproducing laser light is focus-aligned with the mark sequence as a reproducing target may be maintained), so that it is possible to appropriately perform the information reproducing irrespective of the surface blur.

In addition, in the hereinbefore description, the case where the reference plane Ref where the reflection film is formed is formed on the upper layer side from the recording layer as the bulk layer 5 is exemplified. However, even in the case where the reference plane Ref is formed on the lower layer side from the recording layer, the invention may be very suitably adapted.

In addition, in the hereinbefore description, when the reflected lights of the recording/reproducing laser light and the servo laser light are independently received in the side of the apparatus, the method is exemplified where the dichroic prism 19 is provided and the light division is performed by using the difference in wavelength between the lights. Alternatively, a configuration of performing the light division by using a difference in the polarization direction, for example, p polarization/s polarization, or the like may be employed, and the light division may be performed by other methods.

In addition, in the hereinbefore description, the case where the invention is adapted to the recording/reproducing apparatus of performing the mark recording with respect to the recording layer and reproducing the recorded marks is exemplified. However, the invention may be very appropriately adapted to a recording apparatus (recording-dedicated apparatus) of performing only the mark recording with respect to the recording layer or a reproducing apparatus (reproducing-dedicated apparatus) of performing only the reproducing of the recorded marks.

In addition, in the invention, the type of the object lens is not limited to, for example, a two-group lens, a lens including a diffraction grating, or the like.

The present application contains subject matter related to that disclosed in Japanese Priority Patent Application JP 2010-086176 filed in the Japan Patent Office on Apr. 2, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
an optical system comprising:
an object lens to illuminate a first light for performing information recording or information reproducing on a recording layer as a target and a second light different from the first light with respect to an optical recording medium, which includes a reference plane having a reflection film and the recording layer which is disposed at a layer position different from that of the reference plane and on which information recording is performed through mark formation according to light illumination;
a focus-aligned position adjusting unit to adjust a focus-aligned position of the first light through the object lens by changing collimation of the first light incident to the object lens; and
a focusing mechanism to drive the object lens in a focusing direction, which is a direction of approaching/separating with respect to the optical recording medium,
wherein a depth of focus $\lambda/NA^2$ of the first light, defined by a wavelength $\lambda$ of the first light and a numerical aperture NA of the object lens with respect to the first light, is denoted by $\alpha$, a maximum surface blur range of the optical recording medium is denoted by D, the optical system is designed so that a use magnification ratio f3 of the object lens with respect to the first light satisfies $|\beta| \geq \sqrt{(D/\alpha)}$.

2. The optical pickup according to claim 1, wherein the optical system is designed so that the first light is incident, as a converging light, to the object lens in a case where the focus-aligned position of the first light is adjusted to be the layer position of the uppermost portion in the recording layer by the focus-aligned position adjusting unit, and so that the first light is incident, as a diverging light, to the object lens in a case where the focus-aligned position of the first light is adjusted to be a layer position of a lowermost portion of the recording layer by the focus-aligned position adjusting unit.

3. An optical drive apparatus comprising:
an optical pickup including an optical system comprising:
an object lens to illuminate a first light for performing information recording or information reproducing on a recording layer as a target and a second light different from the first light with respect to an optical recording medium, which includes a reference plane having a reflection film and the recording layer which is disposed at a layer position different from that of the reference plane and on which information recording is performed through mark formation according to light illumination;
a focus-aligned position adjusting unit to adjust a focus-aligned position of the first light through the object lens by changing collimation of the first light incident to the object lens and a focusing mechanism to drive the object lens in a focusing direction, which is a direction of approaching/separating with respect to the optical recording medium, wherein a depth of focus $\lambda/NA^2$ of the first light, which is defined by a wavelength $\lambda$ of the first light and a numerical aperture NA of the object lens with respect to the first light, is denoted by $\alpha$, a maximum surface blur range of the optical recording medium is denoted by D, the optical system is designed so that a use magnification ratio $\beta$ of the object lens with respect to the first light satisfies $|\beta| \geq \sqrt{(D/\alpha)}$;
a focusing servo control unit to control the focusing mechanism so that the focus-aligned position of the second light tracks the reference plane based at least in part on a reflected light from the reference plane of the second light; and
a focus-aligned position setting control unit to control the focus-aligned position adjusting unit to perform setting control of the focus-aligned position of the first light.

4. The optical drive apparatus according to claim 3, wherein the optical system is designed so that the first light is incident, as a converging light, to the object lens in a case where the focus-aligned position of the first light is adjusted to be the layer position of the uppermost portion in the recording layer by the focus-aligned position adjusting unit, and so that the first light is incident, as a diverging light, to the object lens in a case where the focus-aligned position of the first light is adjusted to be a layer position of a lowermost portion of the recording layer by the focus-aligned position adjusting unit.

5. A light illumination method in an optical drive apparatus having at least an optical pickup including an optical system comprising an object lens to illuminate a first light for performing information recording or information reproducing on a recording layer as a target and a second light different from the first light with respect to an optical recording medium, which includes a reference plane having a reflection film and the recording layer which is disposed at a layer position different from that of the reference plane and on which information recording is performed through mark formation according to light illumination, and a focus-aligned position adjusting unit to adjust a focus-aligned position of the first light through the object lens by changing collimation of the first light incident to the object lens, and a focusing mechanism to drive the object lens in a focusing direction which is a direction of approaching/separating with respect to the optical recording medium, the light illumination method comprising the steps of:
controlling the focus-aligned position adjusting unit so that the focus-aligned position of the first light is adjusted and a use magnification ratio $\beta$ of the object lens with respect to the first light is adjusted by changing the collimation of the first light incident to the object lens;
controlling the focusing mechanism so that a focus-aligned position of the second light tracks the reference plane based at least in part on a reflected light from the reference plane of the second light; and
illuminating the first light on the optical recording medium by using the optical system, wherein a depth of focus $\lambda/NA^2$ of the first light, which is defined by a wavelength $\lambda$ of the first light and a numerical aperture NA of the object lens with respect to the first light, is denoted by $\alpha$, a maximum surface blur range of the optical recording medium is denoted by D, the optical system is designed so that the use magnification ratio $\beta$ of the object lens with respect to the first light satisfies: $|\beta| \geq \sqrt{(D/\alpha)}$.

* * * * *